United States Patent [19]

Schoenafinger et al.

[11] 4,177,317

[45] Dec. 4, 1979

[54] STABILIZATION OF CHROMIUM DIOXIDE MAGNETIC PIGMENTS

[75] Inventors: Eduard Schoenafinger, Ludwigshafen; Paul Deigner, Weisenheim; Eberhard Koester; Manfred Ohlinger, both of Frankenthal; Dieter Schaefer; Werner Stumpfi, both of Ludwigshafen; Juergen Amort, Troisdorf; Claus-Dietrich Seiler, Rheinfelden; Heinz Nestler, Troisdorf; Otto Ambros, Mannheim, all of Fed. Rep. of Germany

[73] Assignee: BASF Aktiengesellschaft, Fed. Rep. of Germany

[21] Appl. No.: 801,162

[22] Filed: May 20, 1977

Related U.S. Application Data

[63] Continuation of Ser. No. 640,574, Dec. 15, 1975, abandoned.

[51] Int. Cl.² .............................................. H01F 10/02

[52] U.S. Cl. .................................... 428/405; 427/127; 427/128; 428/900

[58] Field of Search ..................... 427/127, 128, 215; 428/405, 900

[56] References Cited

U.S. PATENT DOCUMENTS

| 3,258,382 | 6/1966 | Vincent | 427/215 X |
| 4,007,313 | 2/1977 | Higuchi et al. | 427/127 X |

Primary Examiner—Bernard D. Pianalto
Attorney, Agent, or Firm—Keil & Witherspoon

[57] ABSTRACT

Chromium dioxide magnetic pigments can be stabilized against the loss of their magnetic properties by treating them, in alcoholic aqueous suspension, with a silane or a hydrolysis product thereof, so that when the pigment is isolated from the suspension medium the particles bear at least partially hydrolyzed silane on their surfaces, and then drying the magnetic pigment at from 50° to 200° C.

8 Claims, No Drawings

STABILIZATION OF CHROMIUM DIOXIDE MAGNETIC PIGMENTS

This is a continuation of application Ser. No. 640,574 filed Dec. 15, 1975 and now abandoned.

The present invention relates to the manufacture and use of chromium dioxide magnetic pigments which have improved stability to the loss of their magnetic properties under adverse climatic conditions, and give magnetic recording media with similarly improved stability.

The improvement of the stability of chromium dioxide magnetic pigments by surface treatment has been disclosed. For example, it is known to treat chromium dioxide pigments, in aqueous suspension, with a solution of a reducing agent, such as a sulfite solution, whereby a protective layer of chromium(III) oxide or hydrated chromium(III) oxide is produced on the pigment surface. The pigment is then washed, to remove the sulfate or sulfite, and is dried. The stability of the resulting magnetic pigments depends on the thickness of the resulting protective layer of chromium(III) oxide, but because of the high residual induction required for magnetic tapes of high quality, the layer must not be very thick. The resulting chromium dioxide pigments, and the magnetic tapes manufactured therewith, do not exhibit the requisite level of stability under adverse climatic conditions. The same applies to chromium dioxide pigments which have been stabilized in accordance with the procedure described in U.S. Pat. No. 3,686,031, i.e. by applying a protective layer of an inorganic metal phosphate; inadequate stabilization is achieved.

It is an object of the present invention to provide magnetic recording media, based on chromium dioxide magnetic pigments, exhibiting improved stability against the loss of their magnetic properties under adverse climatic conditions, without a significant decrease in the residual induction of the magnetic layer of the recording media.

It is a further object of the present invention to provide suitable chromium dioxide magnetic pigments for incorporation in magnetic layers when manufacturing such improved magnetic recording media.

We have found that these objects are achieved by stabilizing chromium dioxide magnetic pigments against the loss of their magnetic properties by treating the chromium dioxide pigments, suspended in an alcoholic, aqueous alcoholic or aqueous medium, with a silane of the formula $$R_nSi(OR')_{4-n}$$

where R is an organic radical of 1 to 18 carbon atoms, R' is an aliphatic radical of 1 to 8, and especially of 1 to 4, carbon atoms, and n is an integer from 1 to 3 and especially 1, or with its hydrolysis product, so that after isolating the chromium dioxide pigments from the alcoholic and/or aqueous medium, the surfaces of the particles bear at least partially hydrolyzed silane, and drying the treated chromium dioxide pigments at from about 50° to 200° C. Spray-drying has proved particularly suitable. It is particularly advantageous to heat the substantially dry chromium dioxide magnetic pigments for several hours, eg. from 2 to 10 hours, at from 50° to 200° C. and preferably from about 70° to 170° C., preferably with the pigments in the form of a thin layer. Though the heat treatment may be carried out in air or under an inert gas atmosphere, use of the latter, eg. a nitrogen atmosphere, has proved particularly advantageous.

The present invention also relates to the use of the chromium dioxide magnetic pigments, stabilized as above, for the manufacture of magnetic recording media, and to magnetic recording media which contain chromium dioxide magnetic pigments, stabilized as above, in the magnetic layer.

Advantageous alcoholic media in which the chromium dioxide magnetic pigments may be suspended have proved to be lower aliphatic alcohols and especially monohydric alcohols of 1 to 4 carbon atoms, eg. methanol, ethanol, propanol or isobutanol, as well as appropriate alcohol/water mixtures which preferably contain at least 40 percent by volume of alcohol. Water alone may also be used as the solvent if a silane of the above formula which is substantially water-soluble, or becomes substantially water-soluble or compatible with water as a result of hydrolysis, is used.

The suspension, which is of from 5 to 50 percent strength, advantageously from 15 to 50 percent strength, and especially from 20 to 35 percent strength, by weight, is brought, by the addition of an acid, eg. acetic acid, or a base, eg. aqueous ammonia, to a slightly acid or slightly basic pH, advantageously to a pH of from about 1 to 6, especially from 2 to 6, or from 7.5 to 9.5; a pH of from 8 to 9 has proved to be particularly advantageous.

In an advantageous embodiment, the silane is hydrolyzed in the suspension of the chromium dioxide pigments, in general by adding the silane to the said suspension, which is at a pH within the above ranges or is subsequently brought to the appropriate pH by admixture of an acid or base. The suspension is then advantageously stirred for some time, preferably for from 2 to 10 hours, and preferably at from 20° to 80° C., in order to complete the hydrolysis.

Suitable silanes which can be hydrolyzed are those of the formula $$R_nSi(OR')_{4-n}$$

where R is especially an aliphatic radical of 3 to 18 carbon atoms, and preferably of 3 to 8 carbon atoms, especially an appropriate hydrocarbon radical or a saturated or unsaturated radical interrupted by oxygen atoms in the carbon chain, eg. a propyl, isobutyl, n-butyl, hexyl and 2-ethylhexyl radical, an acryloxyalkyl or methacryloxyalkyl radical, a glycidyloxyalkyl radical or some other radical containing a functional group, or an aromatic radical, eg. phenyl, R' is an aliphatic radical of 1 to 4 carbon atoms, eg. methyl and ethyl, which may advantageously be interrupted by oxygen atoms in the carbon chain, eg. a methoxyethoxy radical or a radical R—O—(CH$_2$—CH$_2$—O)$_x$, where R is alkyl of 1 to 4 carbon atoms and x is an integer of from 1 to 3 (silanes with the latter meaning of R' being particularly suitable for treating chromium dioxide in aqueous suspension), and n is an integer from 1 to 3, especially 1. The use of n-butyl-trimethoxysilane and isobutyl-trimethoxysilane is preferred. The hydrolysis of the silanes first gives a product of the formula $$R_nSi(OH)_{4-n},$$

but condensation products thereof may also be produced depending on the hydrolysis conditions.

The amount of silane or silane hydrolysis product generally used for treating the chromium dioxide magnetic pigments is advantageously from 0.5 to 40 percent by weight, and especially from 3 to 15 percent by weight, based on the amount of the chromium dioxide magnetic pigments. The suspension advantageously contains from about 15 to 50 percent by weight, and especially from about 20 to 35 percent by weight, of dry chromium dioxide.

Chromium dioxide magnetic pigments which may be used are the conventional, preferably acicular, pigments of ferromagnetic crystalline chromium(IV) dioxide. These pigments may already bear a protective surface layer before application of the silanes in accordance with the invention. For example, chromium dioxide magnetic pigments which, following reduction of the pigment surface, already carry a thin protective layer of chromium(III) oxide or hydrated chromium(III) oxide, are very suitable.

We assume that in the treatment according to the invention the silanes applied and/or their hydrolysis products react at least partially with polar groups on the surfaces of the particles and the subsequent drying and heating, with elimination of water, promotes condensation of the hydrolysis products.

The chromium dioxide magnetic pigments stabilized in accordance with the invention may be processed, by conventional methods, into dispersions of the pigments in binders and solvents, for use in producing magnetic layers for magnetic recording media. For the production of such magnetic layers, the ratio of magnetic pigment to binder or binder mixture is in general from 2 to 10 parts by weight, and especially from 3 to 5 parts by weight, of magnetic pigment per part by weight of binder or binder mixture.

The conventional binders for magnetic dispersions may be used, eg. vinyl chloride/vinyl acetate copolymers and their commercially available hydrolysis products containing from about 5 to 20 percent by weight of vinyl alcohol units, copolymers of vinyl chloride with lower esters of maleic acid or fumaric acid, polyvinylformals, copolyamides, mixtures of elastomeric polyester-urethanes, which are practically free from isocyanate groups, with vinyl chloride/vinyl acetate copolymers, vinylidene chloride/acrylonitrile copolymers, polyesters or phenoxy resins, such as are described in German Printed Application No. 1,282,700, U.S. Pat. No. 3,144,352, German Printed Application No. 1,269,661 and German Printed Application No. 1,295,011, and especially mixtures of (a) from 15 to 80 parts by weight of a soluble, thermoplastic polyester-urethane, which is partically free from hydroxyl groups, and is manufactured from an aliphatic dicarboxylic acid of 4 to 6 carbon atoms, eg. adipic acid, an aliphatic diol of 4 to 10 carbon atoms, eg. 1,4-butanediol, and a diisocyanate of 8 to 20 carbon atoms, eg. 4,4'-diisocyanato-diphenylmethane, and (b) from 20 to 85 parts by weight of a polyvinylformal which contains at least 65 percent by weight, preferably at least 80 percent by weight of vinylformal units. Very suitable polyvinylformals contain from 5 to 13 percent by weight of vinyl alcohol units, from 7 to 15 percent by weight of vinyl acetate units and from 80 to 88 percent by weight of vinylformal units and preferably have a viscosity of from 50 to 120 cp, measured at 20° C. on a solution of 5 g of polyvinylformal in 100 ml of a 1:1 phenol/toluene mixture.

Suitable polyester-urethanes are described, eg., in German Printed Application No. 1,106,959; particularly suitable products are those manufactured using branched glycols of 4 to 12 carbon atoms, eg. neopentylene glycol, as the sole glycol or as a mixture with linear glycols, eg. ethylene glycol or 1,4-butanediol.

Conventional rigid or flexible base materials may be used as the non-magnetic and non-magnetizable bases, in particular films of linear polyesters, eg. polyethylene terephthalate, which are generally from 5 to 50$\mu$ thick and in particular from about 10 to 35$\mu$ thick.

Preparation of the magnetic coatings may be carried out in a conventional manner. The magnetic dispersion prepared from the magnetic pigment and the binder solution in the presence of dispersing agents and other additives in dispersing apparatus, e.g. a tube mill or a stirred ball mill, is advantageously filtered and applied to the non-magnetizable base in one or more thin layers or to a base already carrying another magnetic coating, using conventional coating equipment, e.g. a knife coater. Usually, orientation of the magnetic particles is effected before the fluid mix has dried on the base, drying being advantageously carried out for from 2 to 5 minutes at temperatures of from 50° to 90° C.

The magnetic coatings may be subjected to a conventional surface treatment, e.g. calendering in which the coated material is passed between polished rollers, with the optional application of pressure and optional heating preferably at temperatures of from 60° to 80° C. Following this treatment the thickness of the magnetic coating is generally from 3 to 20$\mu$ and preferably from 8 to 15$\mu$.

The chromium dioxide magnetic pigments stabilized in accordance with the invention exhibit excellent dispersibility and processability. It is surprising that, despite the usually high mechanical stresses to which the pigments are subjected during dispersing, they give magnetic recording media which, in a hot humid climate, exhibit a degree of stability against the loss of their magnetic properties, especially the residual induction, which is many times greater than that shown by the corresponding untreated chromium dioxide magnetic pigments.

In the following Examples and Comparative Experiments, parts and percentages are by weight, unless stated otherwise. Parts by volume bear the same relation to parts by weight as the liter to the kilogram.

EXAMPLE 1

100 parts of a filter cake, obtained after conventional surface reduction of chromium dioxide with sulfite and comprising about 40 parts of chromium dioxide pigment and about 60 parts of water, are suspended in 50 parts of methanol using a high-speed stirrer. 4.8 parts of isobutyltrimethoxysilane are added and the suspension is then brought to a pH of 8.6 by adding aqueous ammonia and is stirred for a further 2 hours at room temperature to achieve almost complete hydrolysis of the silane to the silanol. The suspension is then fed to a nitrogen-operated spray tower where the magnetic pigment is dried, the gas temperature being from about 130° to 230° C.

One part of the batch is used without additional heat after-treatment (Example 1 A) for the manufacture of magnetic tapes. A second part of the batch is first heated, spread out in a thin layer, for 4 hours at 100° C. in air (Example 1 B), and a third part of the batch is first heated for 8 hours at 100° C. in air (Example 1 C)

Using each of the chromium dioxide magnetic pigments obtained and a chromium dioxide magnetic pigment from the same $CrO_2$ production batch, but obtained—without the silane treatment according to the invention—by spray-drying of the moist pigment filter cake used to produce the stabilized pigment (Comparative Experiment I), magnetic tapes are produced by the same method. For this purpose, about 35 parts of each pigment, 0.2 part of stearic acid, 0.8 part of isopropyl myristate, 27 parts of a solution, of about 13% strength, of an elastomeric polyester-urethane derived from adipic acid, 1,4-butanediol and 4,4'-diisocyanatodiphenylmethane in a mixture of equal parts of tetrahydrofuran and dioxane, 20 parts of a 13% strength solution of a polyvinylformal in a 1:1 tetrahydrofuran/dioxane mixture and 36 parts of the latter solvent mixture are dispersed for several days in a tube mill containing steel balls and the dispersion is then filtered through a paper filter, under pressure, and coated onto polyethylene terephthalate films which are about 25μ thick. The coated films are passed through a magnetic field to orient the magnetic particles, dried at from about 70° to 90° C., and then passed between rollers heated to about 80° C.

The magnetic properties of the 4 different magnetic tapes obtained are then measured (compare Table 1). It is found that the stabilizing treatment, according to the invention, does not significantly reduce the residual induction of the magnetic layer of the tape.

To determine the stability of the magnetic tapes against the loss of their magnetic properties under adverse climatic conditions, samples of the tapes are stored in a conditioning cabinet at 65° C. and 95% relative humidity, and the time it takes for the saturation magnetization of a sample to fall to 90% of the value before the environmental test is determined. This time (in days) is given as $A_{90}$ in Table 1. From the number of days it is possible to derive a relative factor $F_{rel} = A_{90}$ of the treated material/$A_{90}$ of the untreated material, and this factor appears in the last column of Table 1. It is readily apparent that the heat after-treatment can substantially increase the stabilizing effect.

Table 1

Magnetic properties of the magnetic tape, and drop in saturation magnetization during environmental test

| | $M_m$ (mT) | $\frac{M_v}{M_m}$ | $H_c$ (kilo-amps/m) | $A_{90}$ (days) | $F_{rel.}$ (from $A_{90}$) |
|---|---|---|---|---|---|
| Comparative Experiment I (untreated) | 158 | 0.84 | 41.5 | 7 | 1 |
| Example 1 A (without heat treatment) | 168 | 0.86 | 40.4 | 13.7 | 1.96 |
| Example 1 B (4 hours at 100° C.) | 155 | 0.86 | 41.2 | 19.4 | 2.77 |
| Example 1 C (8 hours at 100° C.) | 154 | 0.86 | 41.2 | 26.1 | 3.96 |

EXAMPLE 2

200 parts of a chromium dioxide pigment (magnetic properties of the powder, measured at 160 kiloamps/m: $H_c$:39.1 (kiloamps/m); remanence: 44.3 ($nTm^3g$); saturation magnetization: 84.1 ($nTm^3/g$); tap density: 1.293 ($g/cm^3$)) are suspended in a mixture of 440 parts of water and 200 parts of methanol, using a high-speed stirrer. The pH is brought to 8.9 by adding aqueous ammonia, 20 parts of isobutyltrimethoxysilane are then added and the suspension is refluxed for 1 hour whilst stirring. After having cooled to room temperature, whilst stirring, the suspension is filtered and the pigment which has been separated off is rinsed with 100 parts of methanol. The chromium dioxide magnetic pigment is dried by prolonged heating at 45° followed by heating for 4 hours at 100° C.

Magnetic tapes are produced, as described in Example 1, using the (treated) pigments and the untreated pigments (Comparative Experiment II) and their properties are measured. The results are given in the following Table:

Table 2

| | $M_R$ (mT) | $M_m$ (mT) | $H_c$ (Kilo-amps/m) | $A_{90}$ (days) | $F_{rel.}$ (frpm $A_{90}$) |
|---|---|---|---|---|---|
| Comparative Experiment II | 146 | 170 | 38.8 | 5.8 | 1 |
| Example 2 | 155 | 180 | 38.3 | 25.7 | 4.43 |

EXAMPLE 3

The procedure of Example 2 is followed except that ethanol is used in place of methanol in the pigment suspension. The magnetic tape exhibits the following properties:

$M_R = 150$, $M_m - 174$, $H_c = 38.4$, $A_{90} = 12.1$, $F = 2.1$.

EXAMPLE 4

100 parts of chromium dioxide pigment are suspended in 322 parts of methanol and 38 parts of isobutyltrimethoxysilane and 40 parts of 2% strength aqueous acetic acid are added whilst stirring. The mixture is stirred for ½ hour at room temperature and the pigment is then filtered off and dried for 4 hours at 100° C. Magnetic tapes produced from these pigments as described in Example 1 and subjected to the environmental test have an $A_{90}$ value of 14.3 days and subjected to the environmental test have an $A_{90}$ value of 14.3 days.

EXAMPLE 5

The procedure followed is as in Example 4 except that the suspension is stirred for 4 hours at room temperature to bring about the hydrolysis. The $A_{90}$ value of the magnetic tapes produced as described in Example 1 using the pigment obtained from the suspension is 15.7 days.

EXAMPLE 6 to 8

3 separate batches are prepared using high-speed stirrers, each batch consisting of 200 parts of chromium dioxide pigment originating from the same production batch suspended in 700 parts of technical-grade ethanol.

EXAMPLE 6

32 parts of vinyltrimethoxysilane are added to the 1st batch, and the pH of the suspension is brought to 4.5 with acetic acid.

EXAMPLE 7

32 parts of γ-methacryloxypropyl-trimethoxysilane are added to the 2nd batch, and the pH of the suspension is brought to 3.7 with acetic acid.

EXAMPLE 8

32 parts of γ-glycidykloxypropyltrimethoxysilane are added to the 3rd batch.

All 3 batches are stirred for 3 hours at room temperature; thereafter, the pigment is in each case filtered off, washed with ethanol and dried in vacuo at 70° C.

Magnetic tapes are produced using the pigments treated in this way, and the untreated pigment from the same production batch, as described in Example 1, and are subjected to the environmental test (cf. Example 1). Compared to the tape produced with untreated pigment, the other tapes have $A_{90}$ values improved by the following factors:

Example 6: $F_{rel.} = 2.87$;
Example 7: $F_{rel.} = 2.69$;
Example 8: $F_{rel.} = 2.91$.

EXAMPLES 9 and 10

(a) Stabilization of chromium dioxide magnetic pigment

In each of two stirred vessels, 300 parts of a finely divided chromium dioxide magnetic pigment are suspended in 700 parts of distilled water by means of high-speed stirrers. 90 parts of n-propyltrimethoxyethoxysilane are then added to each suspension.

The pH of one suspension (Example 9) is brought to 9.1 by adding aqueous ammonia while stirring, whereas the pH of the other suspension is brought to 3.2 by adding acetic acid (Example 10).

Both suspensions are stirred thoroughly for a further 2 hours at room temperature. The two batches are then filtered separately, and the treated magnetic pigments are each dried for 4 hours at about 100° C.

(b) Production of magnetic tapes using chromium dioxide magnetic pigments stabilized as above (Example 9 and 10) and using chromium dioxide which has not been treated with silane.

Using each of the chromium dioxide magnetic pigments stabilized as described under (a) (Examples 9 and 10) and using a chromium dioxide magnetic pigment from the same $CrO_2$ production batch, but obtained—without treatment with silane in accordance with the invention—by spray-drying of the moist pigment filter cake used to produce the stabilized pigment (Comparative Example III), magnetic tapes are produced by the process described in Example 1.

Measurement of the residual induction of the magnetic coatings of the 3 different magnetic tapes obtained shows that this property is not lowered by stabilization in accordance with the invention.

In the environmental test, the tapes have the following $A_{90}$ values:

Example 9: 18.5 days
Example 10: 10.4 days Comparative Experiment III (untreated): 5.5 days.

We claim:

1. A process for stabilizing a chromium dioxide magnetic pigment against the loss of its magnetic properties, wherein the chromium dioxide pigment in particle form, suspended in an alcoholic, aqueous-alcoholic or aqueous medium, is treated with a solution in the said medium of a monomeric silane of the formula $$R_nSi(OR')_{4-n}$$

where R is an organic radical of 1 to 18 carbon atoms, R' is an aliphatic organic radical of 1 to 8 carbon atoms and n is an integer from 1 to 3, the pH of the suspension being brought to from 2 to 6 or 7.5 to 9.5 and the silanes are hydrolyzed in the presence of the suspended chromium dioxide pigment, so that after isolating the chromium dioxide pigment from the alcoholic, aqueous-alcoholic or aqueous medium, the surfaces of the chromium dioxide particles bear hydrolyzed silane, and the treated chromium dioxide pigment is dried at from about 50° to 200° C.

2. A process as set forth in claim 1 wherein the amount of hydrolyzed silane with which said chromium dioxide pigment particles is treated is from 0.5 to 40% by weight based on the weight of said particles.

3. A process as set forth in claim 1 wherein the amount of hydrolyzed silane with which said chromium dioxide pigment particles is treated is from 3 to 15% by weight based on the weight of said particles.

4. A process as set forth in claim 1, wherein the treated suspended chromium dioxide magnetic pigment is spray-dried.

5. A process as set forth in claim 1, wherein the substantially dry treated chromium dioxide pigment is heated for several hours at from about 70° to 200° C.

6. A magnetic recording medium, wherein a magnetic layer contains a chromium dioxide magnetic pigment which has been treated, suspended in an alcoholic, aqueous-alcoholic or aqueous medium, with a solution in the said medium of a monomeric silane of the formula $$R_nSi(OR')_{4-n}$$

where R is an organic radical of 1 to 18 carbon atoms, R' is an aliphatic organic radical of 1 to 8 carbon atoms and n is an integer from 1 to 3, so that after isolating the chromium dioxide pigment from the alcoholic, aqueous-alcoholic or aqueous medium, the surfaces of the chromium dioxide particles bear hydrolyzed silane, the treated chromium dioxide pigment having been dried at from about 50° to 200° C.

7. A medium as set forth in claim 6 wherein the amount of hydrolyzed silane with which said chromium dioxide pigment particles is treated is from 0.5 to 40% by weight based on the weight of said particles.

8. A medium as set forth in claim 6 wherein the amount of hydrolyzed silane with which said chromium dioxide pigment particles is treated is from 3 to 15% by weight based on the weight of said particles.

* * * * *